United States Patent [19]
Kobori

[11] 3,768,390
[45] Oct. 30, 1973

[54] PHOTOGRAPHIC CAMERA WITH ELECTRIC SHUTTER

[75] Inventor: Toshio Kobori, Osaka, Japan

[73] Assignee: Minolta Camera Kabushiki Kaisha, Osaka-shi, Osaka-fu, Japan

[22] Filed: July 19, 1971

[21] Appl. No.: 163,602

[30] Foreign Application Priority Data
July 25, 1970 Japan.................... 45/65335

[52] U.S. Cl. ............................................. 95/53 EA
[51] Int. Cl. ............................................. G03b 9/62
[58] Field of Search ...................... 95/53 E, 53 EA

[56] References Cited
UNITED STATES PATENTS 3,208,365  9/1965  Cooper et al. .......................... 95/53
3,435,745  4/1969  Fukushima............................. 95/53

Primary Examiner—Samuel S. Matthews
Assistant Examiner—Michael L. Gellner
Attorney—Watson, Cole, Grindle & Watson

[57] ABSTRACT

A photographic camera with an electric shutter, which first closes a shutter so as to detect whether the voltage of a power source battery used for an electric shutter is suitable or not to operate said electric shutter by pushing down a shutter release button and then renders said electric shutter operative or inoperative depending upon the suitability of the voltage of said power source through an electromagnetic and mechanical means.

4 Claims, 2 Drawing Figures

PATENTED OCT 30 1973

3,768,390

INVENTOR.
TOSHIO KOBORI

BY
Watson, Cole, Grindle & Watson
ATTORNEYS

PHOTOGRAPHIC CAMERA WITH ELECTRIC SHUTTER

BACKGROUND OF THE INVENTION

The present invention relates to an improvement of a photographic camera with an electric shutter and more particularly to a photographic camera which stops the operation of electric shutter when the voltage of said power source battery drops down to below a certain voltage. In the prior art, there has been well known an electric shutter of the type which is provided with a photometric circuit and an exposure time control circuit, and measures the lightness of an object and controls the opening time of a shutter by operating an electromagnet through a switching circuit by means of a RC delay circuit in accordance with the lightness measured of said object, however, in such a type of electric shutter there is used a power source battery for operating the photometric circuit and the exposure time control circuit.

In this case, when the voltage of power source battery drops down to below a certain value it becomes impossible to measure correctly the lightness of an object in the photometric circuit, the working voltage in the switch circuit fluctuates, the exposure time becomes incorrect, and the shutter operation becomes unreliable because it is irregularly opened or closed. Therefore, without knowing that the voltage of power source battery drops down to below a certain value, namely, an unusable state, upon pushing down the shutter release button to photograph said photographing ends in failure because the exposure is not proper, or the shutter has been not opened against the intention of photographing resulting in non-photograph.

OBJECTS OF THE INVENTION

One object of the present invention is to provide a photographic camera with an electric shutter, which is provided with a means for bringing about no prior drawback mentioned above, and does not operate the shutter even though pushing down the shutter release button in the case of that the voltage of a power source battery used for the electric shutter drops down to below a certain value.

Another object of the present invention is to provide a photographic camera provided with a means which detects the voltage of a power source battery used for an electric shutter and renders the shutter mechanism operative or inoperative in accordance with the result detected.

Further another object of the present invention is to provide a photographic camera provided with a means which in order to detect the voltage of a power source battery used for an electric shutter is simple and operated by a very small electric current of said power source battery.

Still further another object of the present invention is to provide a photographic camera provided with a means which closes a switch for a voltage detection circuit of a power source battery used for an electric shutter only by pushing a shutter release button before the electric shutter is operated, and renders the shutter mechanism operative or inoperative depending upon the suitability of the power source battery.

Still further another object of the present invention is to provide a photographic camera provided with a means in which a movable iron piece provided between an electromagnet using a permanent magnet for detecting as a core and a swinging lever for operating the shutter mechanism renders said shutter mechanism operative or inoperative by means of an electromagnet, and is returned to the starting position in interlocking with a film winding mechanism.

SUMMARY OF THE INVENTION

The present invention relates to a photographic camera which is, in order to attain the above-mentioned objects, so formed that a switch for detecting the voltage of a power source battery used for an electric shutter is closed by pushing a shutter release button, and then the cooperative positional relation between a movable iron piece and a swinging lever is changed depending upon the voltage of said power source battery by means of a detection means composed of a winding excited by said power source battery and a permanent magnet provided as a core of an electromagnet, and on the other hand the shutter is rendered operative or inoperative by pushing said shutter release button subsequently, and thereby aims to prevent unreliable operations of the electric shutter caused by that the voltage of power source battery used for operating the electric shutter is too dropped.

Further, in the photographic camera according to the present invention there are provided for a detection means an electromagnet using a permanent magnet as a core and a movable iron piece for cooperating therewith, and thereby the magnetic force of said permanent magnet operates said movable iron core in equilibrating the magnetic force of the winding of said electromagnet effected by the electric current of said power source battery used for operating the electric shutter to the force of a spring energized to the direction for separating said movable iron piece from said permanent magnet.

The difference of voltages in the case of that the voltage of power source battery used for the electric shutter is operative and in the case of that the voltage of power source battery is too consumed to be expected for the correct operation of the electric shutter is very little in practical use, therefore, it is very poor in sensitivity and incorrect to detect said very small voltage difference of the power source battery only by the magnitude of attraction of the electromagnet excited by the battery current. However, as shown in the formation of the present invention described above, by using said permanent magnet together with said spring the equilibration between the attraction of said permanent magnet and the force of said spring can be broken by the small difference of the electro-magnetic force of said electromagnet and it is possible to detect the consumption of the battery very sensitively and correctly.

And, in the present invention said movable iron piece is provided between said electromagnet and the swinging lever provided on a member for interlocking with the operation of shutter release button, and it is characterized to be brought about to the position to engage with or disengage from said swinging lever and to be returned to the starting position in interlocking with the winding operation of the winding lever.

Figure 1:
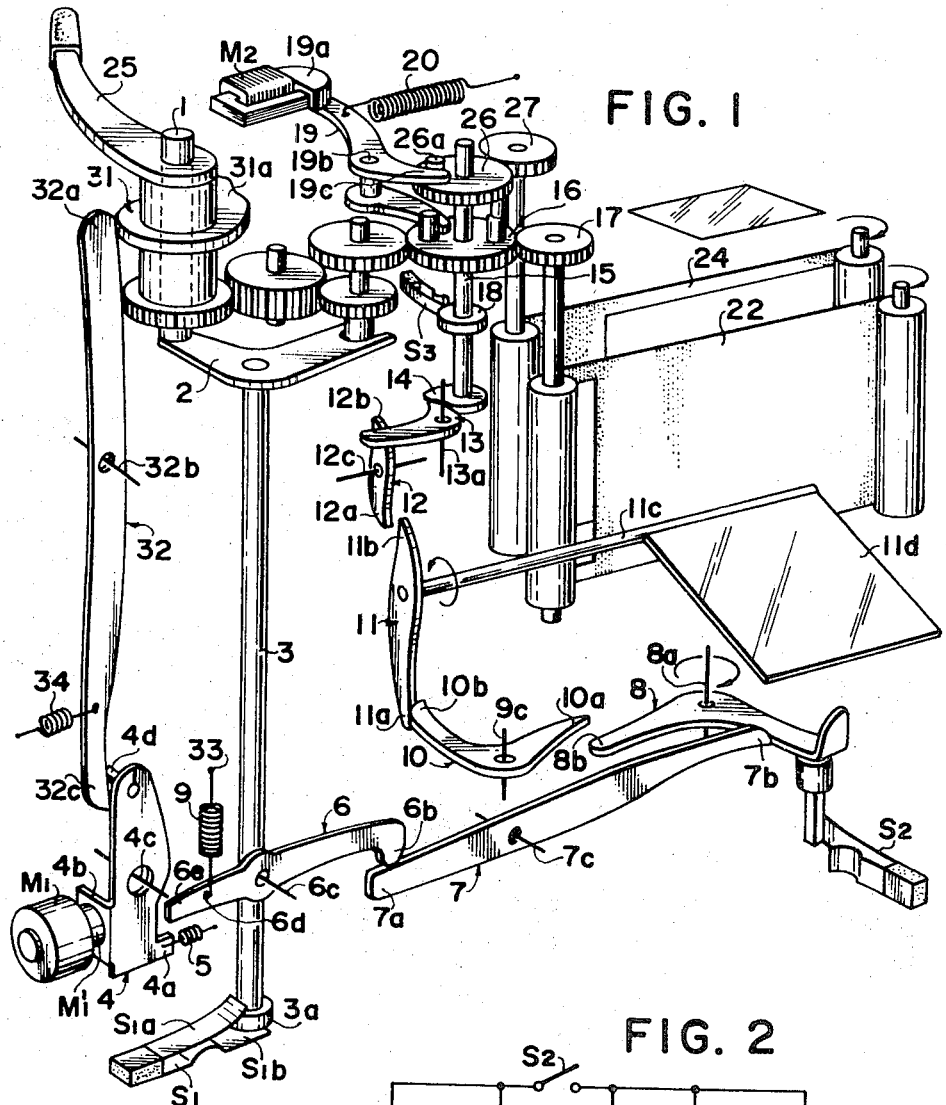
FIG. 1 is a perspective view showing the essential portion of the photographic camera with the electric shutter in an embodiment in accordance with the present invention.

DESCRIPTION OF THE PREFERRED EMBODIMENT:

In FIG. 1, reference numeral 1 denotes a shutter release button, and when said shutter release button 1 is pushed down spindle 3 also is pushed down via fork end portion 2 and the shutter mechanism is started via swinging lever 6 and transmission lever 7. That is, said swinging lever 6 is pivoted at its portion 6c by a pin on spindle 3, and it is pulled up by spring 9 at the left arm 6a of said swinging lever 6. The other end of said spring 9 is fixed to stationary portion 33 of the camera, therefore, said swinging lever 6 is energized to turn clockwise around said pivoting portion 6c. The right arm 6b of said swinging lever 6 is in engaging with the left end 7a of said transmission lever 7. In such a state, when spindle 3 is pushed down the pivoting portion 6c of swinging lever 6 is moved downwardly and said swinging lever 6 is turned counter-clockwise against spring 9, using as a center the right end of said left arm 6b engaged with the left end 7a of transmission lever 7 energized to turn clockwise by a spring not shown in the drawing using pin 7c as a center.

On the other hand, on the lower end of said spindle 3 collar 3a is provided, and when said spindle 3 is in the upper position in the state that shutter release button 1 is not pushed down said collar 3a is in holding up the upper side contact plate $S_1a$ of switch $S_1$ to open said switch $S_1$, and when said shutter release button 1 is pushed down, in the course of the downward moving of said spindle 3 said collar 3a releases once said holding up of upper side contact plate $S_1a$ of switch $S_1$ to close said switch $S_1$, and further pushes down the lower side contact plate $S_1b$ of switch $S_1$ to open said switch $S_1$. Said switch $S_1$ is put in a circuit for detecting whether power source battery E (see FIG. 2) used for operating the electric shutter has or not the voltage above a certain value, and closed in order to feed the current to electromagnet M1 connected said circuit.

Figure 2:
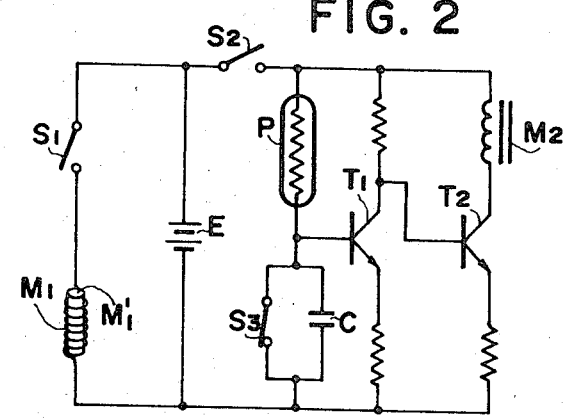
FIG. 2 is an electric circuit diagram in said embodiment.

As to said electromagnet M1, its core is formed by permanent magnet M1' and the excitation effected by the winding of said electromagnet M1 is adapted to be opposite to the polarity of said permanent magnet M1' of the core. As the result, in the state that switch $S_1$ is in opening no excitation current is fed to the winding of electromagnet M1, and accordingly permanent magnet M1' which is the core of electromagnet M1 attracts armature 4b of movable iron piece 4 located in the position to contact therewith and said movable iron piece 4 holds position turned clockwise against spring 5 using its pin 4c as a center. On the other hand, in the state that switch $S_1$ is closed and the excitation current is sufficient, the magnetic force of permanent magnet M1' of the core of electromagnet M1 is negated by the excitation of winding and thereby movable iron piece 4 is turned counter-clockwise by energizing of spring 5 using pin 4c as a center. And, even though switch $S_1$ is closed, in the case of that the excitation current of electromagnet M1 is insufficient, the magnetic force of permanent magnet M1' is not negated by the excitation of winding of electromagnet M1 and movable iron piece 4 holds the state absorbed by permanent magnet M1' which is the core of electromagnet M1 against spring 5. In this manner, by receiving the excitation current of electromagnet M1 from power source battery E for the electric shutter as shown in FIG. 2, in the case of that the voltage of power source battery E is above a certain value the excitation current of electromagnet M1 is sufficient, and in the case of that the voltage of power source battery E is below a certain value the excitation current of electromagnet M1 is insufficient, and accordingly the voltage state of power source battery E can be detected depending upon the movement of movable iron piece 4 effected by the equilibrium between electromagnet M1 and permanent magnet M1'.

Thereupon, by pushing down shutter release button 1 switch $S_1$ electrifies only for a short time and at this juncture, provided the voltage of power source battery E is above a certain value the sufficient excitation current runs through the winding of electromagnet M1 and movable iron piece 4 is turned counter-clockwise using pin 4c as a center.

Said movable iron piece 4 is provided with armature 4b facing permanent magnet M1, a lower restraining portion 4a adapted to restrain the left arm 6a of swinging lever 6, and on the upper portion thereof lug 4d for engaging with lever 32 described later, therefore, said counter-clockwise turning of movable iron piece 4 projects said lower restraining portion 4a downward of the left arm 6a of swinging lever 6, and on the other hand with the progress of coming down of spindle 3 swinging lever 6 intends to turn to move down the left arm 6a of swinging lever 6, using the end of right arm 6b for engaging with the left end 7a of transmission lever 7 as a fulcrum, while said restraining portion 4a of movable iron piece 4 is in moving out in a downward position of the left arm 6a of swinging lever 6, so that swinging lever 6 is checked against the counter-clockwise turning of left arm 6a using the end of right arm 6b as a center. Upon pushing down spindle 3 continuously swinging lever 6 is turned to the direction to press down the end of right arm 6b of swinging lever 6, using the end of left arm 6a of swinging lever 6 engaged with restraining portion 4b of movable iron piece 4 as a fulcrum, and this downward moving of the end of right arm 6b of swinging lever 6 gives the counter-clockwise turning to transmission lever 7 using pin 7c of transmission lever 7 as a center and accordingly power source switch $S_2$ for the electric shutter is closed and the operation of shutter release is started. After armature 4b of movable iron piece 4 is once separated from permanent magnet M1' of the core of electromagnet M1, even though switch $S_1$ is again opened and electromagnet M1 is cut off from the excitation current, said movable iron piece 4 is attracted by no means by the magnetic force of permanent magnet M1'. Therefore, the excitation current of electromagnet M1 is required to feed only for a very short time.

When the voltage of power source battery E for the electric shutter is below a certain value the excitation current running through the winding of electromagnet M1 is small and movable iron piece 4 is left just as attracted by permanent magnet M1 which is the core of electromagnet M1. Therefore, with the process of pressing down of shutter release button 1 swinging lever 6 pivoted on spindle 3 turns the left arm 6a of swinging lever 6 counter-clockwise using the end of right arm 6b engaged with left end 7a of transmission lever 7 as a center, and thereby the left end 7a of transmission lever 7 can not be press down by the right arm 6b of swinging lever 6, and accordingly in this case the shutter can not be released.

In the embodiment illustrated above shows the case of that a focal plane shutter is put to use, so said shutter will be explained hereinafter. When the left end 7a of transmission lever 7 is pressed down by the right arm 6b of swinging lever 6 against the force energized clockwise using pin 7c as a center, lever 8 which clockwise turning is checked by the right end 7b of transmission lever 7 is turned to the direction shown by the arrow using pin 8a as a center and closes power source switch $S_2$ for the electric shutter as described above, and one end 8b of lever 8 kicks one end 10a of lever 10. And, the other end 10b of lever 10 for turning counter-clockwise using pin 10c as a center disengages from one end 11a of lever 11 energized to turn counter-clockwise, so that lever 11 turns reflector 11d fixed to spindle 11c to the direction shown by the arrow, and thereby said reflector 11d located in the photographic light path area is retreated. In the position where reflector 11d is in ascending to the extreme the other end 11b of lever 11 hits on one end 12a of lever 12 and lever 12 is turned clockwise using pin 12c as a center, and accordingly the other end 12b of lever 12 turns lock lever 13 counter-clockwise around pin 13a and thereby cam 14 fixed to spindle 15 which counterclockwise turning has been checked is turned and this turning of cam 14 runs opening screen 22 through switch cam 18 and gears 16, 17 via said spindle 15. Said opening screen 22 starts to run and simultaneously switch cam 18 fixed to spindle 15 opens switch $S_3$ short-circuiting condenser C in the exposure time control circuit shown in FIG. 2, and said condenser C in the exposure time control circuit starts to be charged. In the exposure time control circuit which exposure time is settled in accordance with the time taken for said condenser C to be charged to a certain voltage, when said condenser C is charged to a certain voltage the switching circuit composed of transistors $T_1$, $T_2$ is operated and electromagnet $M_2$ is demagnetized, and thereby lever 19 which iron piece 19a provided on one end thereof has been attracted by electromagnet $M_2$ is turned clockwise by spring 20 using pin 19b as a center. The other end 19c of lever 19 is disengaged from rising 26a provided on gear 26 and rear screen 24 runs via gears 26, 27 energized counter-clockwise.

After photographing finished just as lever 25 is turned counter-clockwise to wind the film, cam 31 provided in a body with lever 25 is simultaneously turned and projection 31a of cam 31 pushes upper end 32a of lever 32 to the left. Therefore, lever 32 energized clockwise by spring 34 using pin 32b as a center is pushed to the right on its lower end 32c and said lower end 32c of lever 32 pushes lug 4d provided on the upper end of movable iron piece 4, and thereby said movable iron piece 4 is turned clockwise against spring 5 and armature 4b of said movable iron piece 4 is contacted with permanent magnet M1'. Just as said movable iron piece 4 is adsorbed once to said permanent magnet M1' said movable iron piece 4 is separated by no means from said permanent magnet only by the force of spring 5 and accordingly the mechanism is in being returned to the original state.

Hereupon, the functional operation of electromagnet M1 will be explained. The voltage of power source battery E is converted to the value of winding current of electromagnet M1, so as to be detected whether power source battery E is usable or not in the circuit for operating the electric shutter, however, in this case the direction of excitation of the winding current is opposite to the polarity of the permanent magnet which is the core. And yet, movable iron piece 4 has been energized to the direction separated from electromagnet M1 by spring 5, so that said movable iron piece 4 can be moved away from electromagnet M1 side by the magnetic force effected by the winding current of electromagnet M1, which is weak as compared with the magnetic force of permanent magnet M1' which is the core of electromagnet M1.

What is claimed is:

1. In a photographic camera including a shutter control circuit having an integrating circuit, an electromagnet and a switching circuit for terminating exposure through said electromagnet after a delay period determined by said integrating circuit, and an electric power source for supplying electric power to said shutter control circuit, a shutter control release mechanism, comprising:
   a shutter releasing mechanism;
   an operating member movable between a rest position and an operating position for actuating said shutter releasing member;
   a control member movable between a first and a second position for respectively interconnecting and disconnecting said operating member to said shutter releasing mechanism;
   a permanent magnet for restraining said control member in said second position;
   a second electromagnet having a coil wound to induce a magnetic field opposed to the field of said permanent magnet;
   means for biasing said control member in said first position opposing the force of said permanent magnet, the forces of said permanent magnet, said second electromagnet and said biasing means being set so that said control member is released from said first postion to move to said second position when the current running through said coil is larger than a predetermined level; and
   a switch member connected between said electric power source and said coil and actuated by said operating member to energize said coil with initial movement of said operating member from said rest position.

2. A control device as set forth in claim 1, wherein said operating member includes a release rod movable from a rest position to an operating position in response to shutter releasing operation and having means for actuating said switch member and an intermediate lever pivotally mounted on the release rod, said control member includes means engageable with said intermediate member with said control member in said first position to rotate said intermediate lever for the actuation of said shutter releasing mechanism.

3. A control device as set forth in claim 2, further comprising a manual member for charging said shutter releasing mechanism, and means for carrying said control member from said second position to said first position in response to the shutter charging operation.

4. A control device as set forth in claim 1, wherein the camera is a single lens reflex camera including a movable reflex mirror and a first driving means for driving said mirror from a viewing position to a photographing position, and a second driving means for driving a diaphragm setting member from a full aperture position to a predetermined aperture position, and said shutter releasing mechanism including means for actuating said first and second driving means and subsequently releasing said shutter releasing mechanism, whereby said operating means only initiates the operation of said shutter releasing mechanism.

* * * * *